(12) United States Patent
Matsumoto et al.

(10) Patent No.: US 11,165,956 B2
(45) Date of Patent: Nov. 2, 2021

(54) IMAGING APPARATUS

(71) Applicant: Panasonic Intellectual Property Management Co., Ltd., Osaka (JP)

(72) Inventors: Ryohei Matsumoto, Osaka (JP); Taku Kariyazaki, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 55 days.

(21) Appl. No.: 16/702,970

(22) Filed: Dec. 4, 2019

(65) Prior Publication Data

US 2020/0204730 A1 Jun. 25, 2020

(30) Foreign Application Priority Data

Dec. 19, 2018 (JP) .............................. JP2018-237574

(51) Int. Cl.
*H04N 5/232* (2006.01)
*H04N 1/387* (2006.01)
*H04N 1/21* (2006.01)

(52) U.S. Cl.
CPC ....... *H04N 5/23229* (2013.01); *H04N 1/2112* (2013.01); *H04N 1/3871* (2013.01); *H04N 5/23293* (2013.01); *H04N 2201/325* (2013.01)

(58) Field of Classification Search
CPC ........ H04N 1/2112; H04N 1/21; H04N 5/772; H04N 2201/325; H04N 2201/3242
See application file for complete search history.

(56) References Cited

U.S. PATENT DOCUMENTS

| 6,643,416 | B1 | 11/2003 | Daniels et al. |
| 7,227,576 | B2* | 6/2007 | Umeyama .......... H04N 1/00453 348/333.11 |
| 7,424,171 | B2* | 9/2008 | Matsuzaka ......... H04N 1/00167 382/275 |

(Continued)

FOREIGN PATENT DOCUMENTS

| JP | 2003219346 A | * | 7/2003 |
| JP | 2003244507 A | * | 8/2003 |

(Continued)

OTHER PUBLICATIONS

Extended European Search Report for corresponding European Application No. 19214679.3 dated May 11, 2020.

*Primary Examiner* — John Villecco
(74) *Attorney, Agent, or Firm* — Renner, Otto, Boisselle & Sklar, LLP (57) ABSTRACT

An imaging apparatus includes an imager and an image converter. The imager captures an image of a subject to generate original image data representing the image captured with a predetermined resolution. The image converter performs a predetermined conversion process on the original image data. The image converter reduces a resolution of the original image data to generate first image data representing an entire image represented by the original image data with a resolution being lower than the resolution of the original image data. The image converter clips a part of the image represented by the original image data to generate second image data representing the part of the image clipped from the entire image represented by the original image data.

8 Claims, 11 Drawing Sheets

(56) References Cited

U.S. PATENT DOCUMENTS

| | | | |
|---|---|---|---|
| 8,094,966 B2 * | 1/2012 | Matsuzaka | H04N 1/56 382/275 |
| 8,483,509 B2 * | 7/2013 | Matsuzaka | H04N 1/00167 382/275 |
| 9,392,169 B2 * | 7/2016 | Wada | H04N 5/23245 |
| 9,596,375 B2 * | 3/2017 | Matsuno | H04N 1/215 |
| 9,918,062 B2 * | 3/2018 | Gunji | H04N 5/23293 |
| 10,349,002 B2 * | 7/2019 | Ota | H04N 5/23235 |
| 2002/0048413 A1 | 4/2002 | Kusunoki | |
| 2003/0193567 A1 * | 10/2003 | Hubel | H04N 9/04515 348/207.1 |
| 2004/0056973 A1 | 3/2004 | Takaiwa | |
| 2009/0262371 A1 | 10/2009 | Nakano | |
| 2011/0043654 A1 * | 2/2011 | Fujita | H04N 5/232 348/222.1 |
| 2015/0103204 A1 * | 4/2015 | Suzuki | H04N 5/23293 348/231.3 |
| 2015/0334296 A1 * | 11/2015 | Gunji | H04N 5/23293 386/225 |
| 2017/0295344 A1 * | 10/2017 | Ota | H04N 5/23235 |
| 2017/0318300 A1 * | 11/2017 | Suzuki | H04N 19/85 |

FOREIGN PATENT DOCUMENTS

| | | | |
|---|---|---|---|
| JP | 2004-120006 A | | 4/2004 |
| JP | 2004120006 A | * | 4/2004 |
| JP | 2008-109482 A | | 5/2008 |
| JP | 2009-182921 A | | 8/2009 |
| JP | 2010-252075 A | | 11/2010 |
| JP | 2011139269 A | * | 7/2011 |
| JP | 2011-170488 A | | 9/2011 |
| JP | 2013-219789 A | | 10/2013 |
| JP | 2013211720 A | * | 10/2013 |
| JP | 2016082276 A | * | 5/2016 |

* cited by examiner

IMAGING APPARATUS

BACKGROUND

1. Technical Field

The present disclosure relates to an imaging apparatus that generates RAW data with a high pixel count.

2. Description of the Related Art

JP 2011-170488 A discloses an image processing apparatus that generates a composite image having a number of pixels equal to or greater than the number of pixels of each image by combining a plurality of images. The image processing apparatus of JP 2011-170488 A generates a composite image by sequentially adding a plurality of enlarged reference images to an enlarged standard image. At this time, the image processing apparatus measures a degree of coverage indicating the density of pixels whose pixel values are determined in the composite image being generated. The image processing apparatus adds a reference image to the composite image being generated, in alignment such that the degree of coverage after adding the reference image is equal to or higher than the degree of coverage before adding the reference image. This reduces pixels whose pixel values are not determined on the high-resolution composite image.

SUMMARY

The present disclosure provides an imaging apparatus that enables image confirmation of original image data such as RAW data with a high pixel count.

An imaging apparatus of the present disclosure includes an imager that captures an image of a subject to generate original image data representing the image captured with a predetermined resolution, and an image converter that performs a predetermined conversion process on the original image data. The image converter reduces the resolution of the original image data to generate first image data representing the entire image represented by the original image data with a resolution that is lower than the resolution of the original image data, and clips a part of the image represented by the original image data to generate second image data representing the part of the image clipped from the entire image represented by the original image data.

According to the present disclosure, by generating image data with a low pixel count from original image data with a high pixel count, it is possible to confirm an image of the original image data in the imaging apparatus.

DETAILED DESCRIPTION

Hereinafter, an embodiment will be described in detail with reference to the drawings as appropriate. However, unnecessarily detailed description may be omitted. For example, detailed description of already well-known matters and redundant description on substantially the same configuration may be omitted. This is to avoid unnecessary redundancy of the following description and to facilitate understanding by those skilled in the art. It should be noted that the inventor(s) provide the accompanying drawings and the following description to enable those skilled in the art to sufficiently understand the present disclosure. They are not intended to limit the subject matter recited in the claims.

Circumstances Leading to the Present Disclosure

RAW data is data representing the intensity of light captured by an image sensor for each pixel, and cannot be seen as an image as it is. Hereinafter, information including the intensity of light of each pixel represented by RAW data is referred to as an "original image". Conventionally, image data in JPEG format is generated from RAW data generated by an image sensor. For example, a user can confirm the composition and the like of captured RAW data by visually recognizing image data in JPEG format on a display monitor of an imaging apparatus. However, an image processing engine having a function of generating image data in JPEG format from RAW data cannot process RAW data having a pixel count that exceeds its own performance.

In recent imaging apparatuses, as a method of generating image data having a high pixel count, some of them have a function of combining original images represented by RAW data generated by an image sensor to thereby generate RAW data representing one original image having a high pixel count. Since the RAW data of a high pixel count generated in this manner has a pixel count exceeding the performance of the image processing engine, the image processing engine cannot process the RAW data of the high pixel count. Therefore, image data in JPEG format is not generated from RAW data of a high pixel count. Therefore, the user could not confirm the image for RAW data of a high pixel count. For this reason, the convenience for the user has been lost.

In order to solve such a problem, the imaging apparatus of the present disclosure generates image data of a low pixel count from RAW data of a high pixel count. Specifically, the imaging apparatus of the present disclosure generates RAW data of a low pixel count that can be processed by the image processing engine, from RAW data of a high pixel count.

The image processing engine generates image data in JPEG format or the like from the RAW data of a low pixel count. Thus, the user can confirm an image corresponding to the RAW data of a high pixel count on the display monitor of the imaging apparatus. Therefore, the inconvenience for the user can be eliminated. Hereinafter, the details of such an imaging apparatus will be described.

Embodiment

As an example of an imaging apparatus according to the present disclosure, description will be given on a digital camera having a function of generating RAW data representing one original image (composite image) of a high pixel count by combining original images (captured images) each represented by RAW data.

In the present embodiment, RAW data (an example of captured data) representing an original image (captured image), generated by an image sensor, is referred to as "captured RAW data". RAW data representing an original image (composite image) of a high pixel count, generated by combining a plurality of units of captured RAW data, is referred to as "composite RAW data".

1. Configuration 1-1. Configuration of Digital Camera

Figure 1:
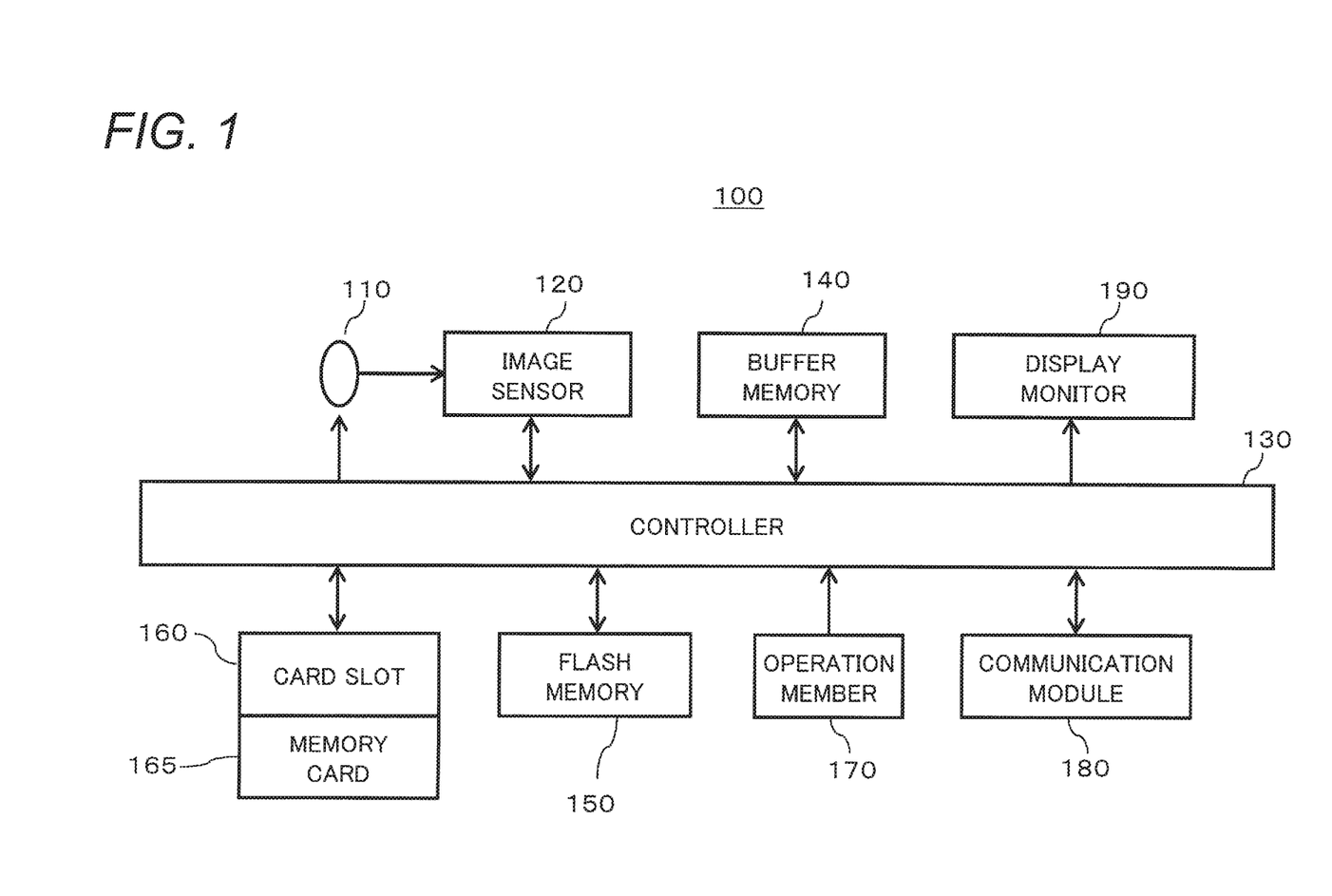
FIG. 1 is a block diagram showing a configuration of a digital camera according to an embodiment of the present disclosure.

A configuration of a digital camera according to the present embodiment will be described with reference to FIG. 1. FIG. 1 is a diagram showing a configuration of a digital camera according to the present embodiment. A digital camera 100 images a subject and generates RAW data. The digital camera 100 according to the present embodiment has a high-resolution shooting mode in addition to a normal shooting mode. Normal shooting mode is a mode for generating captured RAW data representing one original image by a single shooting operation of a user. High-resolution shooting mode is a mode for generating composite RAW data representing one original image of a high pixel count by generating and combining a plurality of pieces of captured RAW data by one shooting operation of a user.

The digital camera 100 according to the present embodiment includes an optical system 110, an image sensor 120, a controller 130, and a buffer memory 140. The digital camera 100 further includes a flash memory 150, a card slot 160, an operation member 170, a communication module 180, and a display monitor 190.

The optical system 110 includes a focus lens, a zoom lens, an optical image stabilizer lens (OIS), an aperture, a shutter, and the like. The various lenses included in the optical system 110 may be configured of any number of lenses or any group.

The image sensor 120 performs a still image capturing operation, a through image capturing operation, and the like. The image sensor 120 captures a subject image formed via the optical system 110, and generates captured RAW data for a still image. The image sensor 120 generates image data of a new frame at a predetermined frame rate (for example, 30 frames/second) for a through image. The generation timing of the captured RAW data and the electronic shutter operation in the image sensor 120 are controlled by the controller 130. As the image sensor 120, various image sensors such as a CMOS image sensor, a CCD image sensor, or an NMOS image sensor can be used. The image sensor 120 is an example of the image-pickup device in the present embodiment.

The controller 130 controls the operation of the digital camera 100. The controller 130 includes a CPU and the like, and the CPU executes a program (software) to realize a predetermined function. The controller 130 may include, in place of the CPU, a processor configured of dedicated electronic circuits designed to realize a predetermined function. That is, the controller 130 can be realized by various processors such as a CPU, an MPU, a GPU, a DSU, an FPGA, and an ASIC. The controller 130 may be configured of one or more processors.

The controller 130 performs image processing on the RAW data to generate image data in JPEG format, and records the RAW data and the image data on a memory card 165 loaded in the card slot 160. In addition, the controller 130 can display the image data recorded on the memory card 165 on the display monitor 190 according to the operation performed on the operation member 170 by the user.

The buffer memory 140 is a recording medium that functions as a work memory of the controller 130. In the present embodiment, the buffer memory 140 is realized by a Dynamic Random Access Memory (DRAM). The flash memory 150 is a non-volatile recording medium. Although not shown, the controller 130 may have various internal memories such as a ROM, for example. The ROM stores various programs to be executed by the controller 130. The controller 130 may also incorporate a RAM that functions as a work area of the CPU.

The card slot 160 is a means into which the removable memory card 165 is inserted. The card slot 160 can connect the memory card 165 electrically and mechanically. The memory card 165 is an external memory internally provided with a recording element such as a flash memory. The memory card 165 can store data such as captured RAW data, composite RAW data, and image data in JPEG format. The memory card 165 is an example of a recording medium.

The operation member 170 is a generic name of hard keys such as operation buttons and operation levers provided on the exterior of the digital camera 100, and receives an operation by the user. The operation member 170 includes, for example, a release button, a mode dial, and a touch panel. When the operation member 170 receives an operation by the user, the operation member 170 transmits an operation signal corresponding to the user operation to the controller 130.

The communication module 180 includes a circuit that performs communication conforming to the communication standard IEEE 802.11, Wi-Fi standard, or the like. The digital camera 100 can communicate with other devices via the communication module 180. The digital camera 100 may communicate directly with another device via the communication module 180 or may communicate via an access point. The communication module 180 may be connectable to a communication network such as the Internet. The communication module 180 may include a circuit for performing communication conforming to the communication standard 802.15.1, that is, Bluetooth (registered trademark) standard. The digital camera 100 may perform communication conforming to the Bluetooth standard with another device via the communication module 180.

The display monitor 190 is provided on the back of the digital camera 100. The display monitor 190 is an example of a display that displays various types of information. For example, the display monitor 190 displays an image represented by image data captured by the image sensor 120 and subjected to image processing by the controller 130. The display monitor 190 also displays a menu screen or the like for the user to make various settings on the digital camera 100. The display monitor 190 can be configured of, for example, a liquid crystal display device or an organic EL device.

Switching between the normal shooting mode and the high-resolution shooting mode can be set by, for example, the user via a mode dial, a predetermined operation button, a menu screen, or the like.

1-2. Internal Configuration of Controller

Details of the controller 130 in the present embodiment will be described with reference to FIG. 2.

Figure 2:
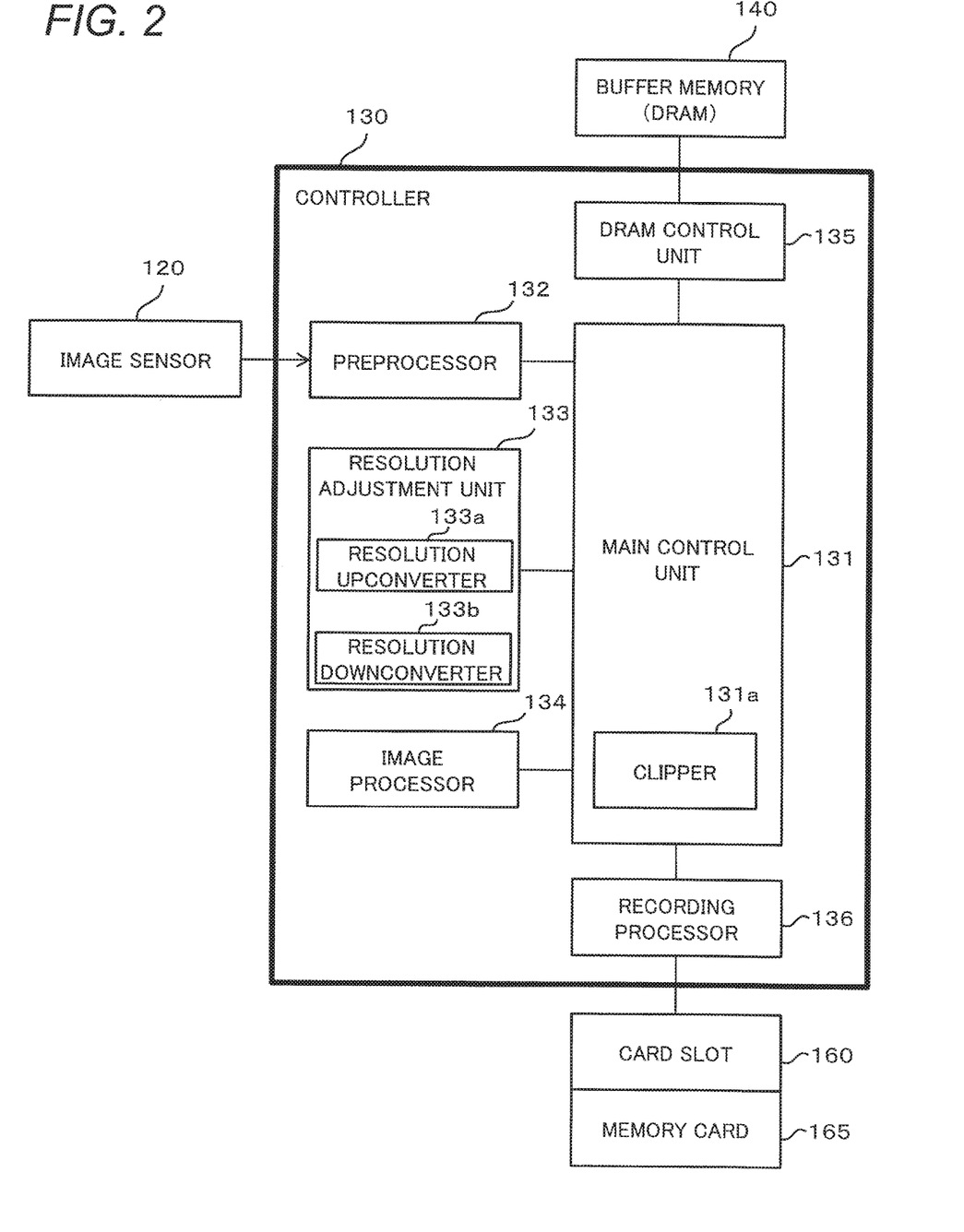
FIG. 2 is a diagram showing an internal configuration of a controller.

FIG. 2 is a diagram showing the internal configuration of the controller 130. The controller 130 includes a main control unit 131, a preprocessor 132, a resolution adjustment unit 133, an image processor 134, a DRAM control unit 135, and a recording processor 136.

The main control unit 131 centrally controls the overall operation of the digital camera 100. The main control unit 131 includes, for example, a CPU. The main control unit 131 includes a clipper 131a that performs processing to cut out a part of the composite RAW data. The clipper 131a specifies, for example, a processing range of composite RAW data.

The preprocessor 132 performs various types of preprocessing on the captured RAW data output from the image sensor 120. The various types of preprocessing include, but are not limited to, linearity correction, defective pixel correction, black level correction, noise removal, and the like.

The resolution adjustment unit 133 includes a resolution upconverter 133a and a resolution downconverter 133b. In the high-resolution shooting mode, the resolution upconverter 133a combines a plurality of pieces of captured RAW data output from the image sensor 120, and generates composite RAW data representing one original image of a high pixel count. The resolution downconverter 133b generates RAW data having resolution lower than that of the composite RAW data by performing, for example, pixel mixing processing or thinning processing on the composite RAW data. Hereinafter, low-resolution data generated by the resolution downconverter 133b is referred to as "low-resolution RAW data". The resolution adjustment unit 133 is realized by, for example, a DSP.

The image processor 134 is an image processing engine that performs various types processing on the RAW data to generate image data. Examples of various types of processing include white balance correction, gamma correction, YC conversion processing, electronic zoom processing, compression processing such as JPEG compression, decompression processing, and the like, but are not limited thereto. For example, the image processor 134 converts RGB of RAW data into YCbCr to generate image data in JPEG format. In other words, the image processor 134 develops the RAW data. The image processor 134 may be configured of a hard-wired electronic circuit, or may be configured of a microcomputer using a program, a processor, or the like.

The DRAM control unit 135 controls writing and reading of data to and from the buffer memory 140.

The recording processor 136 controls writing and reading of data to and from the memory card 165 loaded in the card slot 160.

The controller 130 configured as described above may be configured of one semiconductor chip. Alternatively, some functions of the controller 130 may be configured of a DSP or the like.

2. Operation

Operation of the digital camera 100 will be described below.

2-1. Generating Captured RAW Data in Normal Shooting Mode

At the time of image shooting in the normal shooting mode, the digital camera 100 captures an image of a subject formed via the optical system 110 with the image sensor 120 to generate captured RAW data.

2-2. Generating Composite RAW Data in High-Res Shooting Mode

Figure 3:
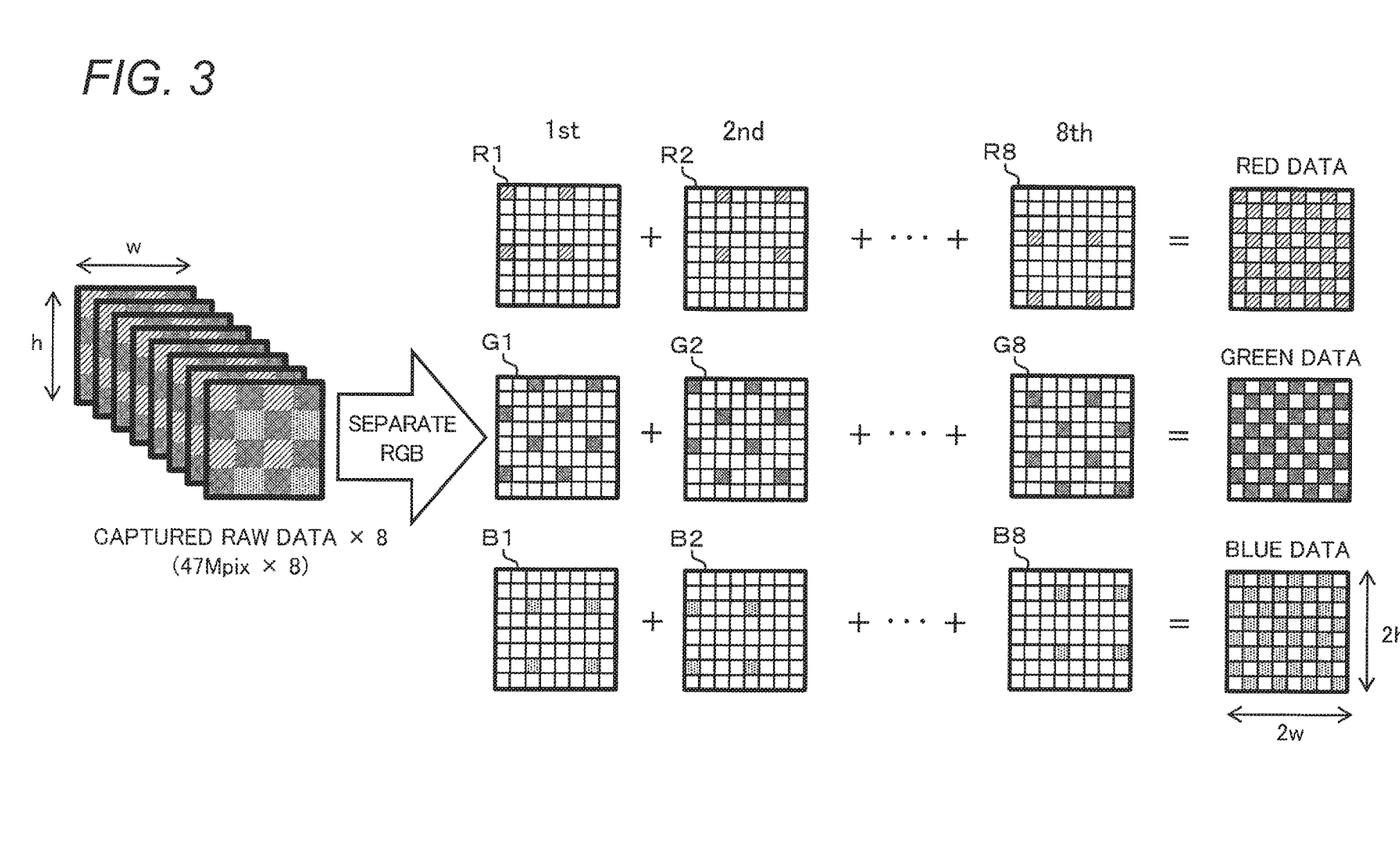
FIG. 3 is a diagram for explaining generation of red data, green data, and blue data in a high-resolution shooting mode.

The high-resolution shooting mode will be described with reference to FIGS. 3 and 4.

In the high-resolution shooting mode, the digital camera 100 uses the body image stabilizer (BIS mechanism) of the camera body, and moves the image sensor 120 by a predetermined number of pixels (where movable pitch is 0.5 pixels) for imaging. Thus, eight pieces of captured RAW data representing eight original images are generated. As shown in FIG. 3, the resolution upconverter 133a doubles the number of vertical and horizontal pixels of each of the eight original images, and separates RGB from one another. Thereby, pixel data units R1 to R8 indicating the positions of red pixels, pixel data units G1 to G8 indicating the positions of green pixels, and pixel data units B1 to B8 indicating the positions of blue pixels are generated. The resolution upconverter 133a generates red data indicating the positions of the red pixels for the eight pieces, from the pixel data units R1 to R8 corresponding to the first to eighth original images. Similarly, the resolution upconverter 133a generates green data indicating the positions of the green pixels for the eight pieces, from the pixel data units G1 to G8 corresponding to the first to eighth original images. The resolution upconverter 133a generates blue data indicating the positions of the blue pixels for the eight pieces, from the pixel data units B1 to B8 indicating the positions of the blue pixels corresponding to the first to eighth original images.

Figure 4:
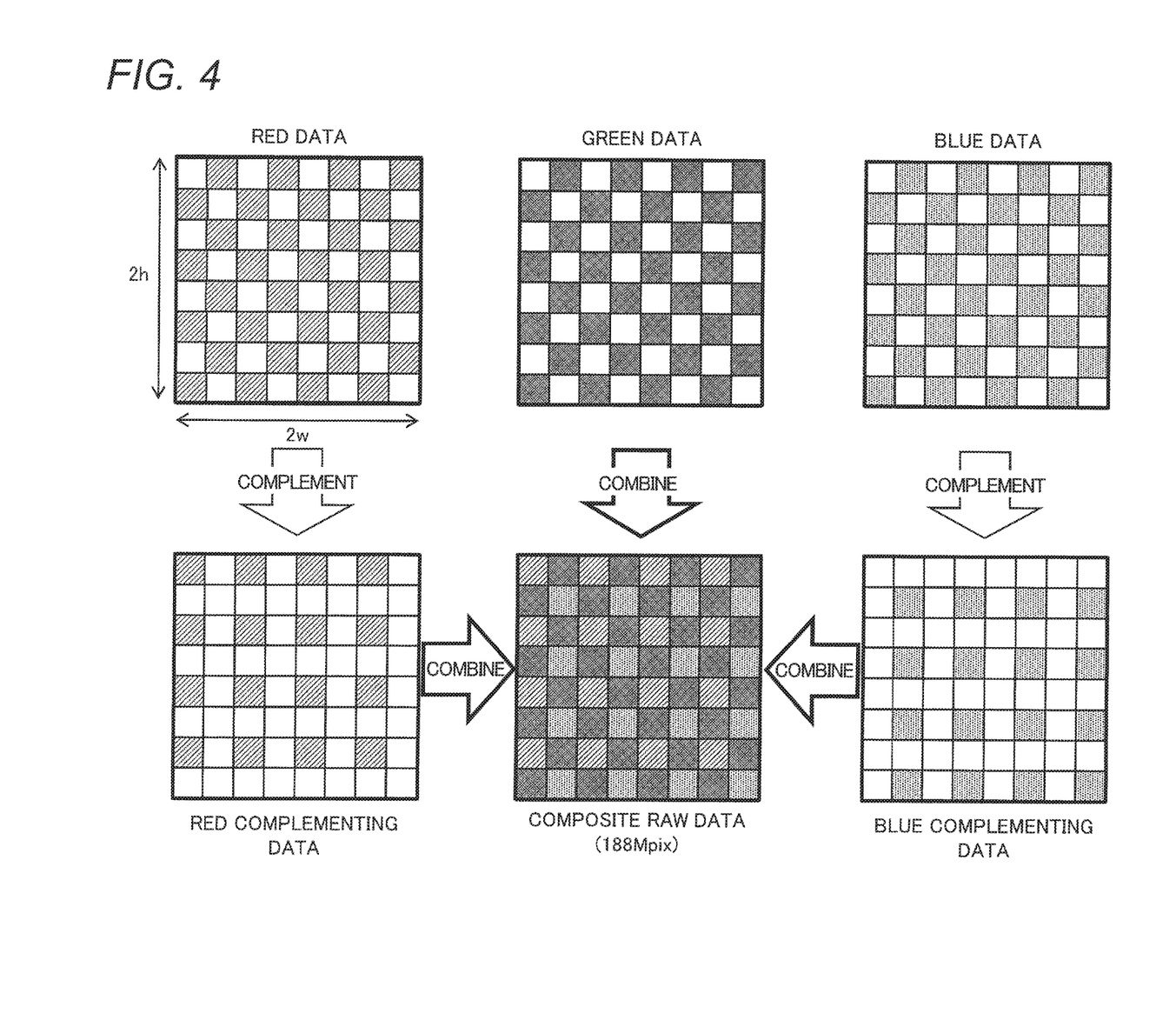
FIG. 4 is a diagram for explaining composition of red data, green data, and blue data in a high-resolution shooting mode.

The resolution upconverter 133a generates, from the red data, red complementing data indicating the positions of the red pixels as shown in FIG. 4 by the complementation algorithm. The resolution upconverter 133a generates, from the blue data, blue complementing data indicating the positions of the blue pixels as shown in FIG. 4 by the complementation algorithm. The resolution upconverter 133a combines the green data, the red complementing data, and the blue complementing data to generate composite RAW data of the Bayer array. The composite RAW data generated in this manner has twice as many vertical and horizontal pixels as the captured RAW data generated by the image sensor 120. For example, when the captured RAW data of 47 megapixels (Mpix) is generated by the image sensor 120, the composite RAW data has 188 MPix.

2-3. Performance of Image Processor

Performance of the image processor 134 will be described with reference to FIGS. 5A to 5C. As described above, the performance of the image processor 134 is limited. Therefore, the image processor 134 can process only RAW data of a predetermined number of pixels (for example, 80 Mpix) or less.

Figure 5A:
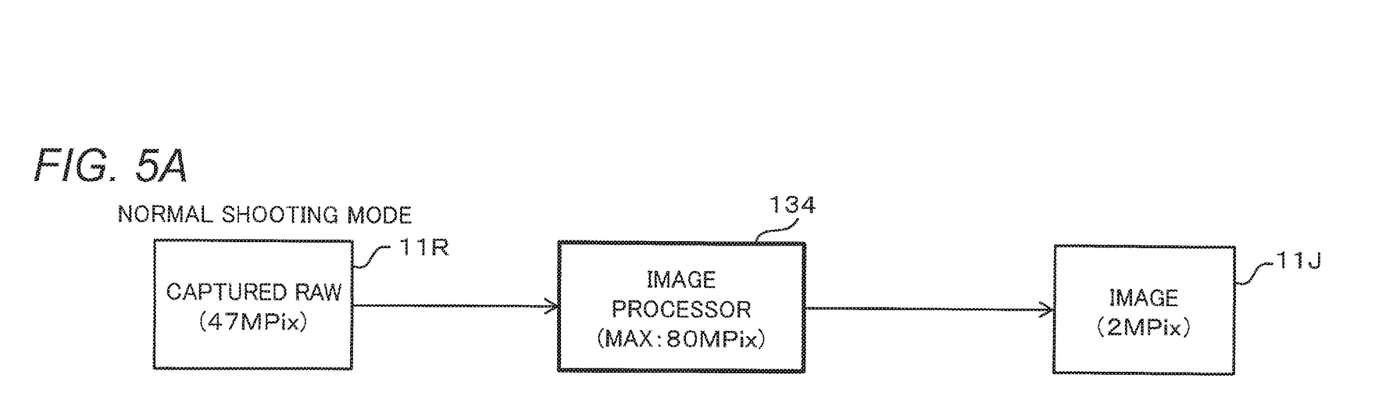
FIG. 5A is a diagram for explaining image processing in a normal shooting mode.
Figure 5B:
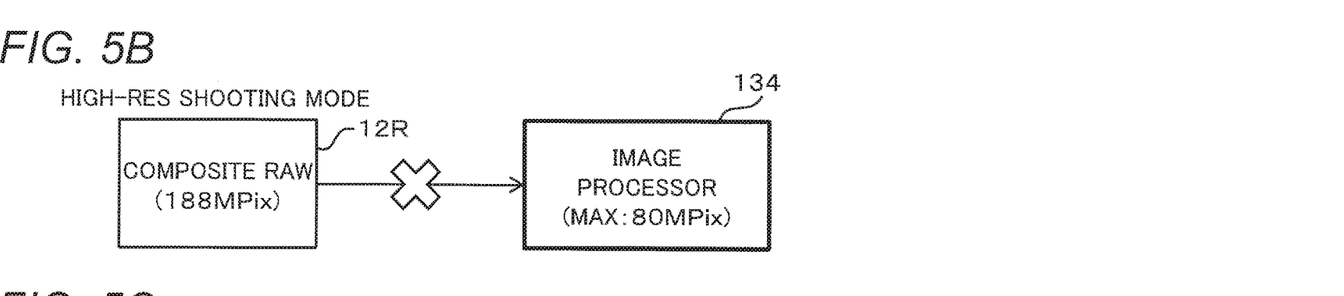
FIG. 5B is a diagram for explaining an example that image processing is not possible in the high-resolution shooting mode.

As shown in FIG. 5A, for example, when the image sensor 120 generates captured RAW data 11R of 47 Mpix in the normal shooting mode, the image processor 134 can perform image processing on the captured RAW data 11R and generate image data 11J in JPEG format.

However, as described above, the composite RAW data generated in the high-resolution shooting mode has a high pixel count, that is, 188 MPix, for example. In this case, as shown in FIG. 5B, the image processor 134 cannot process composite RAW data 12R.

After shooting, the user may wish to check, on the display monitor 190, whether the shot photo has the intended composition, whether the effect of high-resolution shooting can be confirmed, whether a composition error has not been occurred, whether the focus is made as intended, or the like.

Figure 5C:
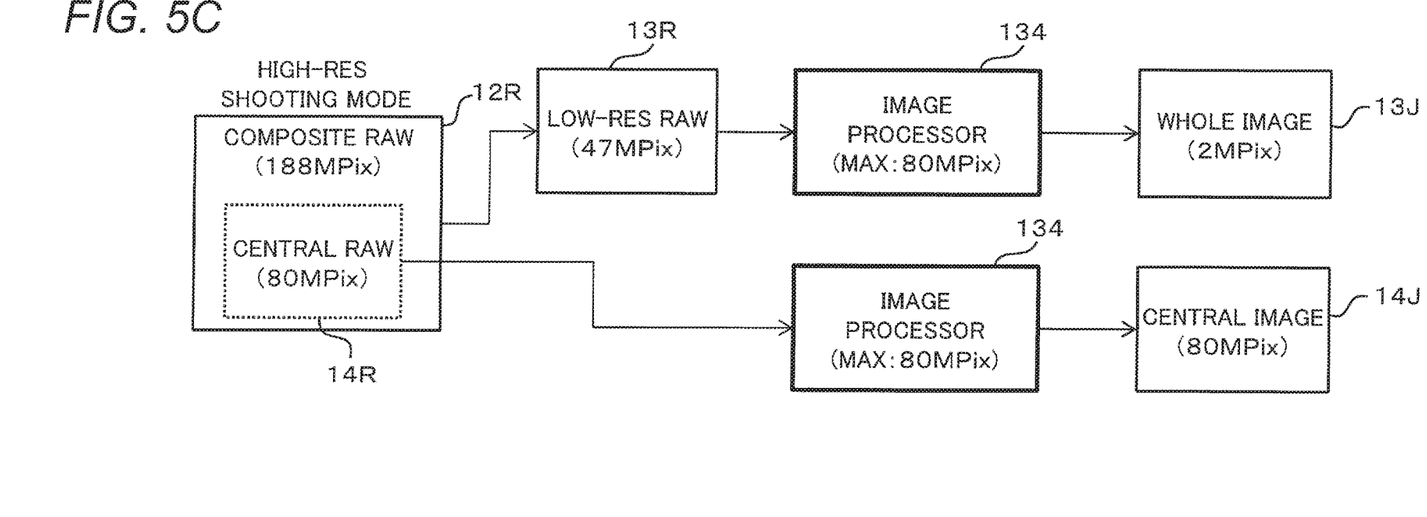
FIG. 5C is a diagram for explaining image processing in the high-resolution shooting mode according to the present embodiment.

Therefore, in the present embodiment, as shown in FIG. 5C, the image processor 134 is allowed to process two pieces of RAW data 13R and 14R of a low pixel count obtained from the composite RAW data 12R generated in the high-resolution shooting mode.

One of the two pieces of RAW data of a low pixel count is the RAW data 13R generated by performing pixel mixing to lower the resolution of the composite RAW data 12R. For example, the low-resolution RAW data 13R of 47 MPix is generated from the composite RAW data 12R of 188 MPix, and from the low-resolution RAW data 13R, YC data (intermediate data) is generated by the image processor 134, and the YC data is resized and then applied with JPEG conversion processing. Thereby, image data 13J in JPEG format corresponding to the low-resolution RAW data 13R is obtained. The image data 13J corresponding to the low-resolution RAW data 13R corresponds to the entire angle of view at the time of imaging and represents the entire imaging range, and thus is referred to as "whole image data".

The other of the two pieces of RAW data of a low pixel count is the RAW data 14R in which a part of the composite RAW data 12R is clipped. For example, central RAW data 14R corresponding to a central portion of the composite RAW data 12R is processed by the image processor 134. For example, the central RAW data 14R for 80 MPix, which is a central portion of 188 MPix composite RAW data 12R, is processed by the image processor 134. Thereby, image data 14J in JPEG format corresponding to the central RAW data 14R is obtained. The image data 14J corresponding to the central RAW data 14R corresponds to a part of the angle of view at the time of imaging and represents only the central portion of the imaging range, and thus is referred to as "central image data". The central image data 14J is generated by clipping only the central portion of the composite RAW data 12R. Therefore, the angle of view is narrower than that of the whole image data 13J.

Since the images represented by the whole image data 13J and the central image data 14J in JPEG format can be reproduced on the display monitor 190, the user can confirm an image corresponding to the composite RAW data 12R generated by the high-resolution shooting.

2-4. Shooting Operation

Figure 6:
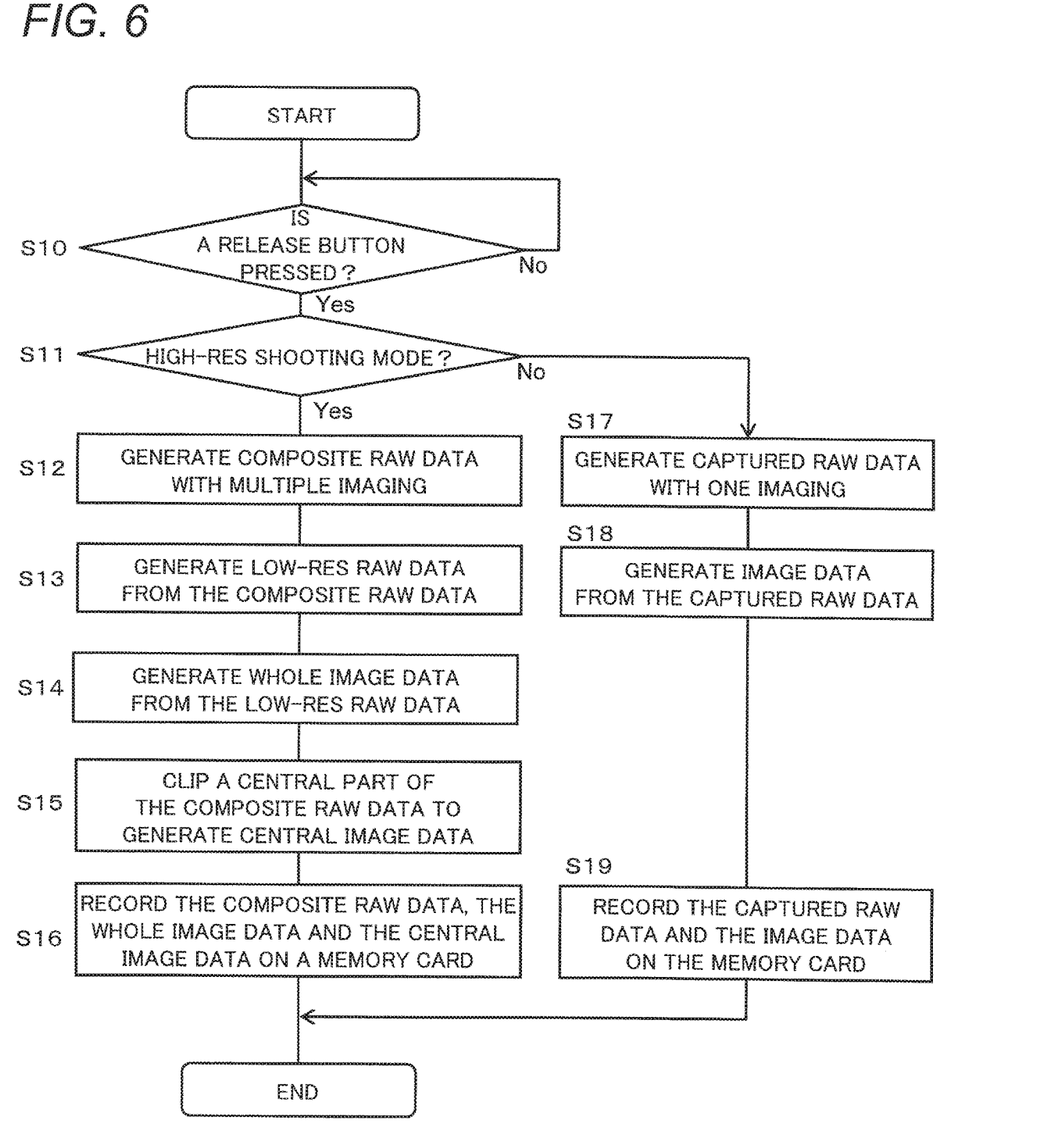
FIG. 6 is a flowchart showing processing for image shooting in a digital camera.
Figure 7:
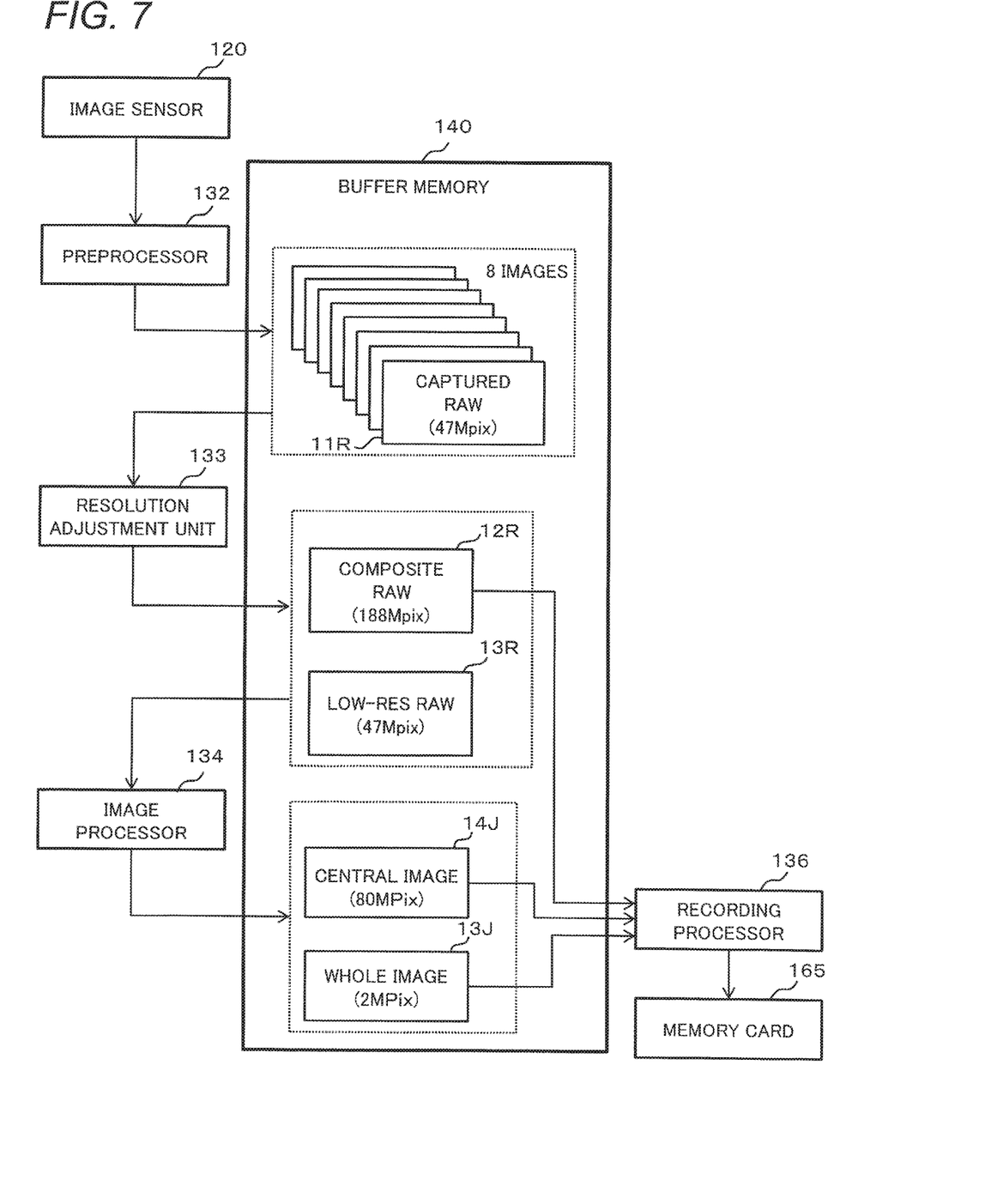
FIG. 7 is a diagram for explaining generation of image data for the image shooting.
Figure 8:
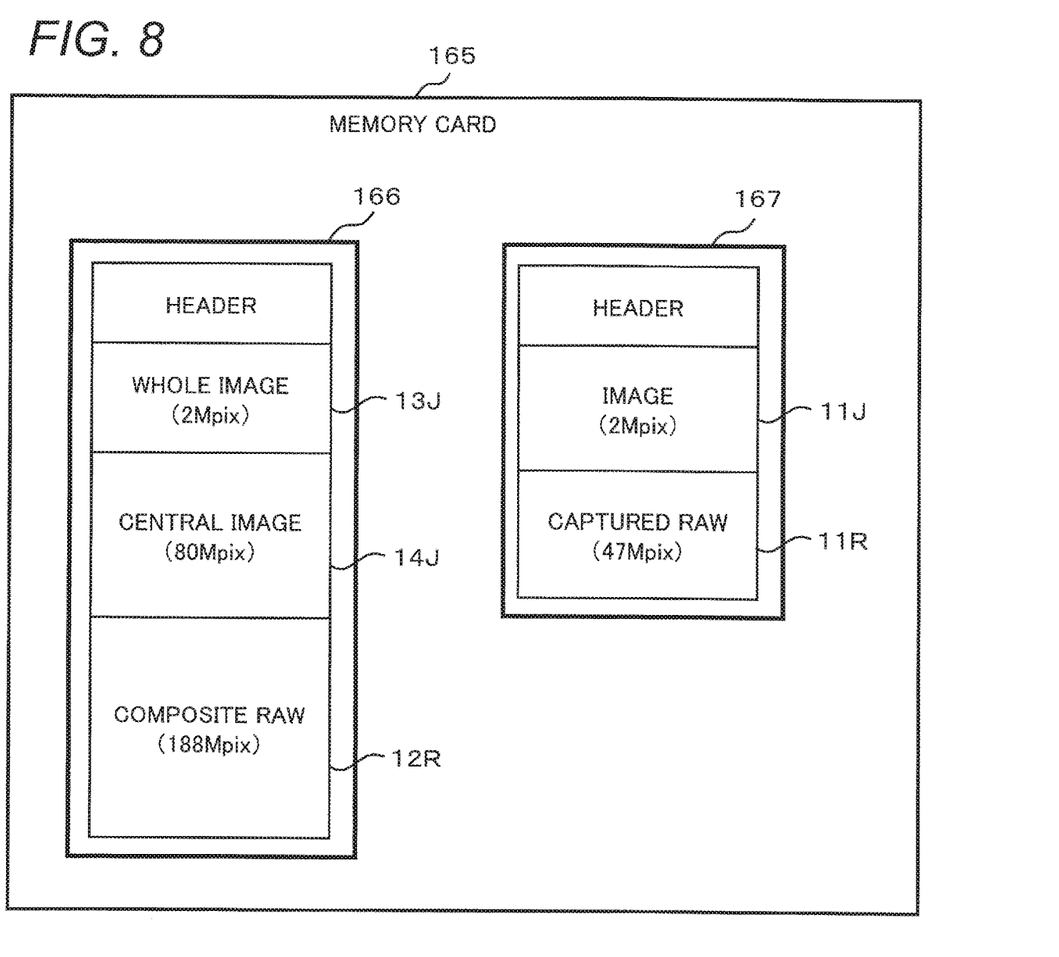
FIG. 8 is a diagram showing file configurations of pieces of data generated in the normal shooting mode and the high-resolution shooting mode.

FIG. 6 is a flowchart showing processing for image shooting by the digital camera 100. FIG. 7 shows data generated for the image shooting. FIG. 8 shows an example of a file configuration when the generated data is recorded on the memory card 165. The processing for the image shooting by the digital camera 100 will be described with reference to FIGS. 6 to 8.

When the user issues an image shooting instruction by pressing the release button (YES in S10), the controller 130 determines whether or not the shooting mode is the high-resolution shooting mode (S11). When the high-resolution shooting mode is set (YES in S11), the main control unit 131 controls the image sensor 120 to perform imaging multiple times to generate the composite RAW data 12R (S12). At this time, the preprocessor 132 performs preprocessing on each of the original images represented by a plurality of pieces of the captured RAW data 11R generated by the image sensor 120. The pieces of captured RAW data 11R are temporarily stored in the buffer memory 140 by the DRAM control unit 135. The resolution upconverter 133a of the resolution adjustment unit 133 combines the original images represented by the pieces of captured RAW data 11R after the preprocessing, and generates the composite RAW data 12R. The composite RAW data 12R is temporarily stored in the buffer memory 140 by the DRAM control unit 135.

The resolution downconverter 133b of the resolution adjustment unit 133 generates the low-resolution RAW data 13R having resolution that is equal to or less than the performance limit of the image processor 134, from the composite RAW data 12R (S13). The low-resolution RAW data 13R is temporarily stored in the buffer memory 140 by the DRAM control unit 135.

The main control unit 131 reads out the low-resolution RAW data 13R stored in the buffer memory 140 via the DRAM control unit 135, and causes the image processor 134 to process it. The image processor 134 converts the low-resolution RAW data 13R to be in JPEG format to generate the whole image data 13J (S14).

The main control unit 131 reads out the composite RAW data 12R stored in the buffer memory 140 via the DRAM control unit 135. The main control unit 131 controls the image processor 134 so as to generate image data by designating a part of the composite RAW data 12R, that is, the range of the central portion in the present embodiment. Specifically, the clipper 131a designates the processing range of the composite RAW data 12R, for example. Thereby, the image processor 134 converts, to be in JPEG format, the central RAW data 14R corresponding to the designated range of the composite RAW data 12R, to generate the central image data 14J (S15).

The recording processor 136 records the composite RAW data 12R, the whole image data 13J, and the central image data 14J in association with each other on the memory card 165 (S16). Specifically, as shown in FIG. 8, the recording processor 136 records a file 166 having a file configuration including a header for identifying the file format, the composite RAW data 12R, the whole image data 13J, and the central image data 14J, on the memory card 165.

In the case of the normal shooting mode (No in S11), the main control unit 131 controls the image sensor 120 to perform imaging once and generate the captured RAW data 11R (S17).

The main control unit 131 causes the image processor 134 to process the captured RAW data 11R. The image processor 134 converts the captured RAW data 11R to be in JPEG format, and generates the image data 11J corresponding to the captured RAW data 11R (S18).

The recording processor 136 associates the captured RAW data 11R with the image data 11J and records them on the memory card 165 (S19). Specifically, as shown in FIG. 8, the recording processor 136 records, on the memory card 165, a file 167 having a file configuration including a header for identifying the file format, the captured RAW data 11R, and the image data 11J.

2-5. Reproduction Operation for High-Res Shooting Mode

Figure 9:
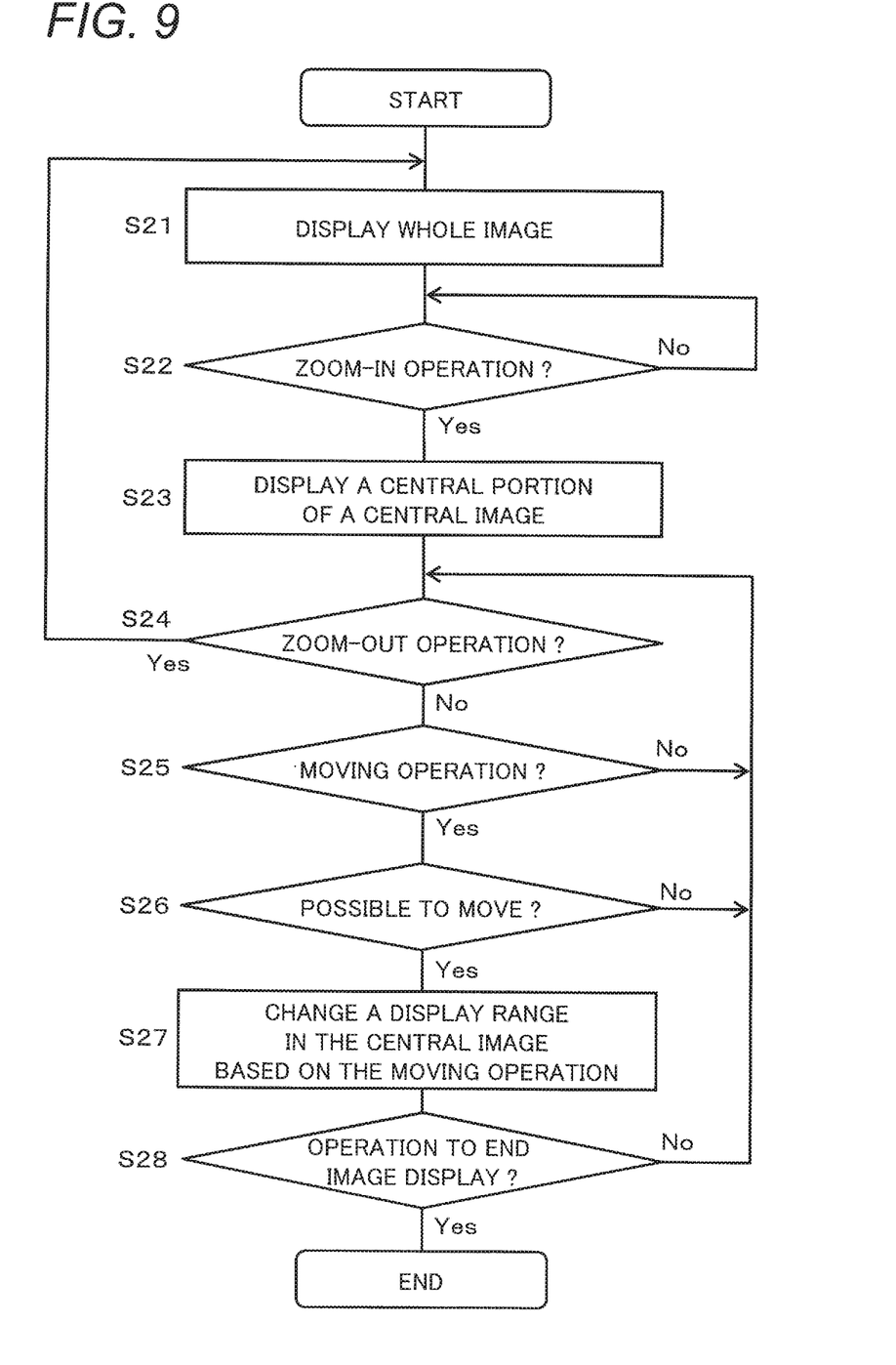
FIG. 9 is a flowchart showing processing for image reproduction in a digital camera.
Figure 10A:
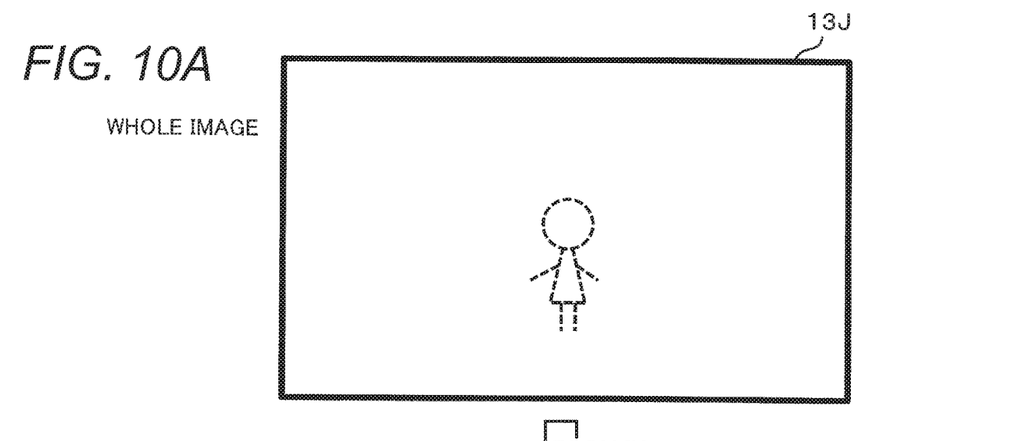
FIGS. 10A to 10C are diagrams each showing exemplary display on a screen at the image reproduction.
Figure 10B:
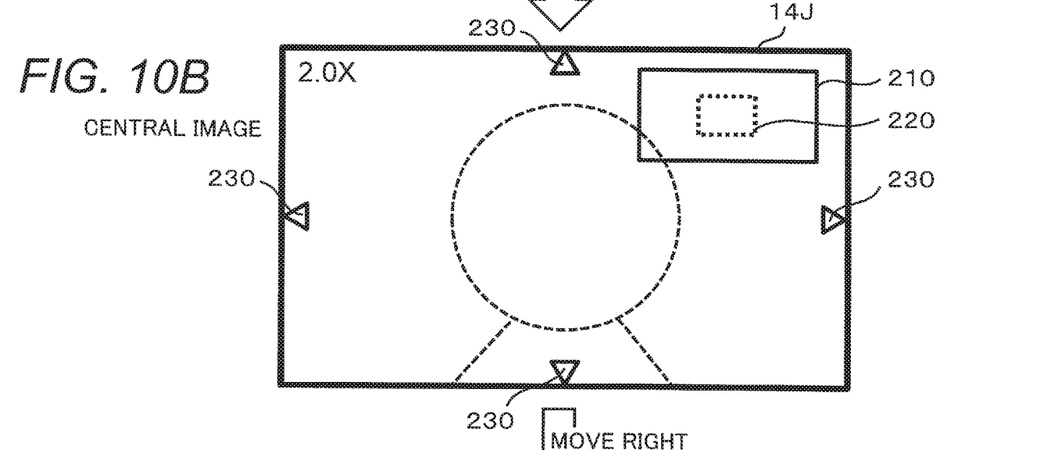
Figure 10C:
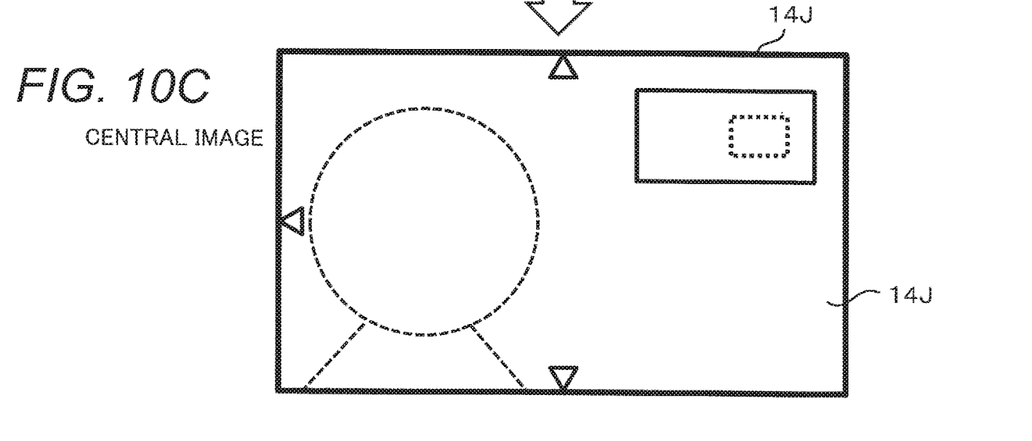
Figure 11A:
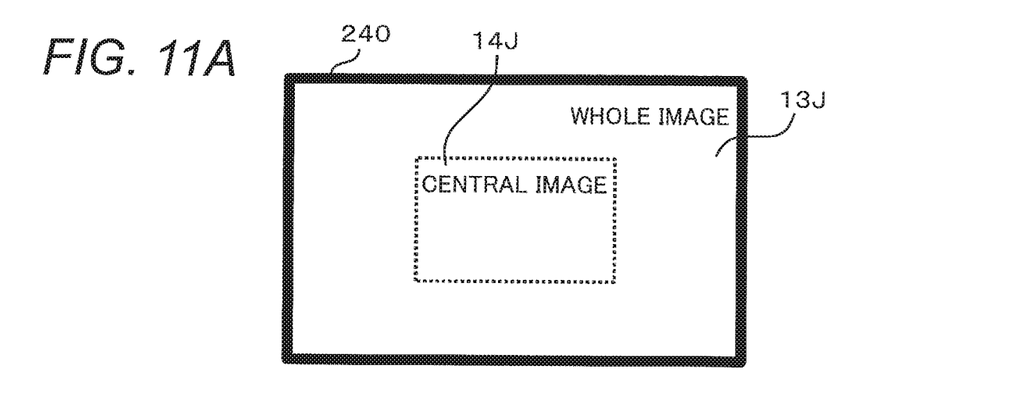
FIGS. 11A to 11C are diagrams each showing a display range of the image corresponding to FIGS. 10A to 10C.
Figure 11B:
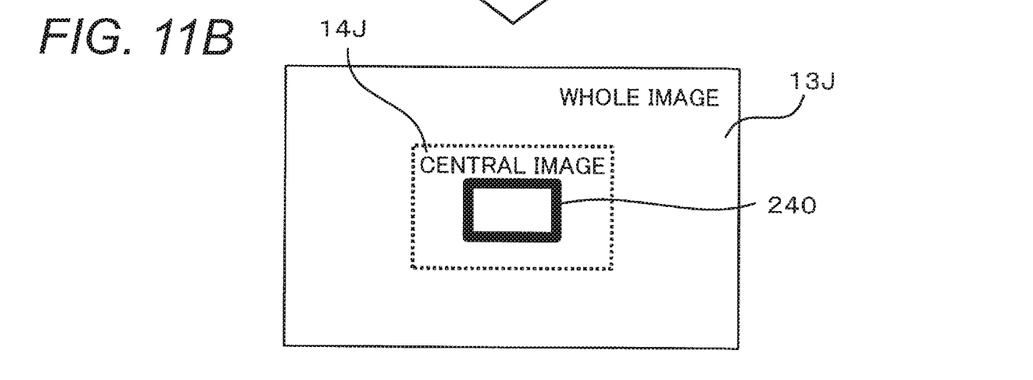
Figure 11C:
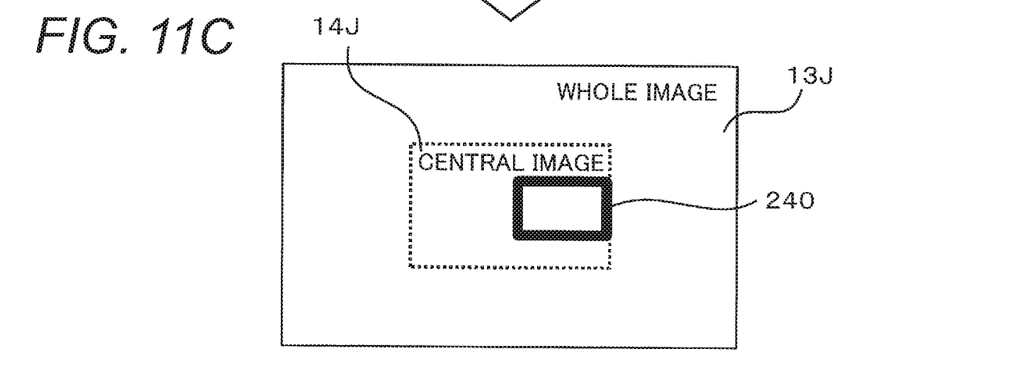

FIG. 9 is a flowchart showing processing for reproduction of an image captured in the high-resolution shooting mode. FIGS. 10A to 10C show exemplary display on the screen at the reproduction of the image captured in the high-resolution shooting mode. FIGS. 11A to 11C show the display ranges of the image corresponding to FIGS. 10A to 10C. For example, FIGS. 11A, 11B, and 11C correspond to FIGS. 10A, 10B, and 10C, respectively. A process for the image reproduction by the digital camera 100 will be described with reference to FIGS. 9 to 11C.

When reproduction is instructed by the user with respect to an image captured in the high-resolution shooting mode, the main control unit 131 reads the whole image data 13J included in the file 166 from the memory card 165. The main control unit 131 displays the whole image data 13J on the display monitor 190 (S21). At this time, as shown in a display range 240 of FIG. 11A and FIG. 10A, the entire image represented by the whole image data 13J is displayed on the display monitor 190.

The main control unit 131 determines whether or not a zoom-in operation is performed via the operation member 170 (S22). When the user performs a zoom-in operation (Yes in S22), the main control unit 131 reads the central image data 14J included in the file 166 from the memory card 165. The main control unit 131 displays the central image data 14J on the display monitor 190 (S23). At this time, as shown in the display range 240 of FIG. 11B, only the central portion of the image represented by the central image data 14J is displayed on the display monitor 190. As shown in FIG. 10B, on the display monitor 190, a frame 210 indicating the size of the entire image and a frame 220 indicating the range of the image currently displayed are displayed only for a predetermined time after zooming. For example, the frame 210 is green, the frame 220 is yellow, and the predetermined time is one second. The display monitor 190 further displays an arrow 230 indicating a movable direction.

The main control unit 131 determines whether or not a zoom-out operation is performed (S24). When a zoom-out operation is performed by the user (Yes in S24), the main control unit 131 displays the whole image data 13J on the display monitor 190 again (S21).

The main control unit 131 determines whether or not a moving operation is performed via the operation member 170 while the central image data 14J is displayed (S25). When the moving operation is performed by the user (Yes in S25), the main control unit 131 determines whether or not moving of the display position based on the moving operation of the user is possible (S26). As shown in FIG. 11C, the main control unit 131 limits the range in which zoom reproduction can be performed to the range of the central image data 14J.

If moving of the display position is possible (Yes in S26), the main control unit 131 changes the display range of the image displayed on the display monitor 190 based on the moving operation of the user (S27). For example, when the user performs a moving operation to the right, the main control unit 131 displays an image in the range to the right of the central image data 14J. At this time, for example, when the right end of the central image data 14J is reached, as shown in FIG. 10C, the display monitor 190 eliminates the display of the arrow 230 indicating that moving to the right is possible.

The main control unit 131 determines whether or not the user is performed an operation to end the image display (S28). When an operation to end the image display is performed, the main control unit 131 ends the reproduction process shown in FIG. 9. When the operation to end the image display is not performed, the process returns to step S24.

As described above, in the case of displaying an image corresponding to the composite RAW data 12R generated in the high-resolution shooting mode, when displaying the entire image, the main control unit 131 causes the entire whole image data 13J to be displayed on the display monitor 190. Thereby, the user can confirm the whole image of the composite RAW data. When the zoom reproduction is performed, the main control unit 131 displays a part of the central image data 14J on the display monitor 190. As a result, the user can confirm the resolution of the composite RAW data.

2-6. Reproduction Operation for Normal Shooting Mode

When reproduction is instructed by the user with respect to the captured RAW data 11R captured in the normal shooting mode, the main control unit 131 reads the image data 11J corresponding to the captured RAW data 11R from the memory card 165 and displays it on the display monitor 190. In the normal shooting mode, only one piece of image data 11J is generated. Therefore, when the entire image is to be displayed, the entire image data 11J is displayed, and when the zoom reproduction is performed, a part of the image data 11J is displayed. The main control unit 131 permits zoom reproduction within the entire range of the image data 11J for zoom reproduction of the image data 11J generated in the normal shooting mode. Therefore, when the user operates to move the display range to the end of the image during the zoom reproduction, for example, the end of the frame 220 representing the position of the image currently displayed matches the frame 210 representing the size of the entire image.

3. Effects

As described above, the digital camera 100 that is an example of the imaging apparatus of the present embodiment includes the image sensor 120 and the controller 130. The image sensor 120 and the controller 130 constitute an imager that captures a subject and generates RAW data (an example of original image data) such as captured RAW data and composite RAW data. The original image represented by the RAW data is an example of an image captured at a predetermined resolution. The image sensor 120 that is a part of the imager is an example of an image-pickup device that images a subject multiple times to generate multiple captured RAW data. The resolution upconverter 133a that is a part of the imager combines the multiple captured RAW data to generate composite RAW data having a higher pixel count than that of the captured RAW data. The controller 130 is an example of an image converter that performs predetermined conversion process on the composite RAW data. Specifically, the predetermined conversion process is a process of generating, from the composite RAW data, whole image data (an example of first image data) and central image data (an example of second image data) having a lower pixel count than that of the composite RAW data. More specifically, the resolution downconverter 133b and the image processor 134 reduce the resolution of the composite RAW data to less than that of the composite RAW data, to generate whole image data that represents the entire image represented by the composite RAW data at a resolution lower than that of the composite RAW data. The clipper 131a and the image processor 134 clip a part of the image represented by the composite RAW data, to generate central image data representing a partial image clipped from the entire image represented by the composite RAW data.

As a result, even if the RAW data has a high pixel count, the image confirmation using the whole image data and the central image data becomes possible. For example, the image can be confirmed on the display monitor 190. In addition, even in the case of confirming the image on the display separate from the digital camera 100, the image confirmation can be performed with use of the whole image data and the central image data generated by the digital camera 100. By confirming the image using the whole image data, it is possible to confirm the entire image of the composite RAW data, that is, composition, brightness, color, and the like, for example. By confirming the image using the central image data, it is possible to confirm whether or not the sense of resolution of the composite RAW data, that is, whether or not the effect of high-resolution shooting appears, for example. The image processor 134 can generate image data in JPEG format from RAW data having a predetermined number of pixels or less. The resolution downconverter 133b generates low-resolution RAW data in which the resolution of the composite RAW data is reduced to a predetermined number of pixels or less. The clipper 131a clips a part of the composite RAW data so as to have a predetermined number of pixels or less. The main control unit 131 causes the image processor 134 to process low-resolution RAW data to generate whole image data, and causes the image processor 134 to process a part of the clipped composite RAW data to generate central image data.

As described above, even if the composite RAW data having a higher pixel count than the performance of the image processor 134, by using the RAW data processed to have a pixel count reduced to a level that can be processed by the image processor 134, it is possible to process it by the image processor 134.

The digital camera 100 further includes the recording processor 136 for recording the whole image data and the central image data on the memory card 165 in a file configuration including at least the whole image data and the central image data, and the card slot 160. The memory card 165 is an example of a recording medium. The recording processor 136 and the card slot 160 are an example of a recorder.

In the present embodiment, the recording processor 136 records composite RAW data together with whole image data and central image data, in a file configuration further including composite RAW data together with the whole image data and the central image data.

The whole image data and the central image data are image data in JPEG format. The digital camera 100 further includes the display monitor 190 (an example of a display) that displays whole image data when displaying the entire image and displays central image data when performing zoom reproduction.

As a result, the user can confirm both the overall image of the composite RAW data and the sense of resolution on the display monitor 190 of the digital camera 100. Thus, the user can confirm the picture immediately after shooting.

Other Embodiments

As described above, the embodiment has been described as an example of the technology disclosed in the present application. However, the technology in the present disclosure is not limited to this, and is also applicable to embodiments in which changes, replacements, additions, omissions, and the like are appropriately made. Moreover, it is also possible to combine respective components described in the embodiment to form a new embodiment.

In the above embodiment, description has been given on an example of generating the whole image data 13J and the central image data 14J from the RAW data 13R and 14R of a low pixel count with respect to the composite RAW data 12R. However, the target for generating the whole image data 13J and the central image data 14J is not limited to the composite RAW data 12R. The digital camera 100 generates the whole image data 13J and the central image data 14J for RAW data having a pixel count higher than the processing performance of the image processor 134. Therefore, for example, when the captured RAW data 11R itself has a pixel count exceeding the performance of the image processor 134, whole image data and central image data corresponding to the captured RAW data 11R are generated.

In the above embodiment, although the clipper 131a clips the central portion of the composite RAW data 12R, the clipped range is not limited to the central portion. Clipping may be made within the range of the original image represented by the composite RAW data 12R. For example, the clipper 131a may clip a predetermined range including a focused position.

In the above embodiment, in the description of image reproduction using FIGS. 10 and 11, the main control unit 131 displays the whole image data 13J on the display monitor 190 when the user does not perform a zoom-in operation, while when the user performs a zoom-in operation, the main control unit 131 displays the central image data 14J on the display monitor 190. Instead of this, the main control unit 131 may display the whole image data 13J on the display monitor 190 at the time of full field angle display (zoom magnification is 1 time) and low magnification (for example, 1.1 to 8 times), while the main control unit 131 may display the central image data 14J on the display monitor 190 at the time of enlargement zoom with a high magnification (for example, 8.1 to 16 times).

In the above embodiment, the controller 130 generates the whole image data 13J (for example, 2 MPix) and the central image data 14J (for example, 80 MPix) as shown in FIG. 5C from the composite RAW data 12R. However, another one or more pieces of image data may be generated. For example, the controller 130 may generate third image data of, for example, 47 Mpix, having a pixel count that is higher than that of the whole image data 13J and is lower than that of the central image data 14J. The third image data includes, for example, the central portion of the imaging range, and the angle of view is wider than that of the central image data 14J and is narrower than that of the whole image data 13J. In this case, the whole image data 13J may be displayed at the time of full angle of view display (zoom magnification is 1 time), the third image data may be displayed at the time of enlargement zoom at a low magnification (for example, 1.1 to 8 times), and the central image data 14J may be displayed at the time of enlargement zoom at a high magnification (for example, 8.1 to 16 times).

In the above embodiment, a digital camera has been described as an example of an imaging apparatus, but the present disclosure is not limited to this. The imaging apparatus may be an electronic device (for example, a video camera, a smartphone, a tablet terminal, or the like) having an image shooting function.

The format of image data described in the above embodiment is just an example, and may be another format. For example, Tagged Image File Format (TIFF) or Portable Network Graphics (PNG) may be used instead of JPEG format.

As described above, the embodiments have been described as examples of the technology in the present disclosure. To that end, the accompanying drawings and the detailed description are provided.

Accordingly, some of the constituent elements described in the accompanying drawings and the detailed description include not only essential constituent elements for solving the problem. Constituent elements not essential for solving the problem may also be included. For this reason, it should not be instantly recognized that these non-essential components are imperative as these non-essential components are described in the accompanying drawings and the detailed description.

Further, since the above-described embodiments are provided to illustrate the technique in the present disclosure, various modifications, replacements, additions, omissions, and the like can be made within the scope of the claims or their equivalents.

The present disclosure is useful for an imaging apparatus having a function of generating RAW data of a high pixel count.

The invention claimed is:

1. An imaging apparatus comprising:
   an imager that captures an image of a subject to generate original image data representing the image captured with a predetermined resolution; and
   an image converter that performs a predetermined conversion process on the original image data, wherein
   the image converter includes:
      an image processor capable of processing data having a predetermined pixel count or less to generate image data in displayable image format;
      a resolution downconverter that generates low-resolution data having the predetermined pixel count or less by performing a process of reducing a resolution of the original image data generated by the imager; and
      a clipper that clips a part of the original image data generated by the imager so as to have the predetermined pixel count or less, and
   the image converter:
      causes the resolution downconverter to generate the low-resolution data by reducing the resolution of the original image data and causes the image processor to generate first image data by processing the low-resolution data, the first image data representing an entire image represented by the original image data with a resolution being lower than the resolution of the original image data; and
      causes the clipper to clip a part of the image represented by the original image data and causes the image processor to generate second image data by processing the clipped part of the original image data, the second image data representing the part of the image clipped from the entire image represented by the original image data.

2. The imaging apparatus according to claim 1, further comprising
   a recorder that records, on a recording medium, the first image data and the second image data in a file configuration including at least the first image data and the second image data.

3. The imaging apparatus according to claim 2, wherein the recorder records, on the recording medium, the original image data together with the first image data and the second image data in a file configuration further including the original image data together with the first image data and the second image data.

4. The imaging apparatus according to claim 1, wherein the first image data and the second image data are image data in JPEG format.

5. The imaging apparatus according to claim 1, wherein the imager includes:
   an image sensor that images a subject multiple times to generate multiple imaged data; and
   the image converter includes:
      a resolution upconverter that combines the multiple imaged data with each other to generate the original image data having a pixel count that is higher than a pixel count of each imaged data in the multiple imaged data.

6. The imaging apparatus according to claim 1, further comprising
   a display that displays the first image data for displaying an entire image, and displays the second image data for zoom reproduction.

7. The imaging apparatus according to claim 1, wherein the original image data generated by the imager has a pixel count higher than the predetermined pixel count capable for the image processor to process.

8. The imaging apparatus according to claim 1, wherein the displayable image format is JPEG format.

* * * * *